United States Patent
Roy Barman et al.

(10) Patent No.: US 11,055,072 B2
(45) Date of Patent: Jul. 6, 2021

(54) GENERATION OF DATA MODEL FROM PROTOCOL BUFFER COMPILER GENERATED JAVA CLASSES

(71) Applicant: JPMorgan Chase Bank, N.A., New York, NY (US)

(72) Inventors: Shashwata Roy Barman, Orlando, FL (US); Kevin Burns, Tampa, FL (US); Alex Louwe Kooijmans, Bradenton, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/535,515

(22) Filed: Aug. 8, 2019

(65) Prior Publication Data

US 2021/0042095 A1 Feb. 11, 2021

(51) Int. Cl.
*G06F 8/35* (2018.01)
*H04L 12/24* (2006.01)
*G06F 8/40* (2018.01)
*G06F 8/41* (2018.01)

(52) U.S. Cl.
CPC ............ *G06F 8/35* (2013.01); *G06F 8/40* (2013.01); *G06F 8/41* (2013.01); *H04L 41/12* (2013.01); *H04L 41/142* (2013.01); *H04L 41/145* (2013.01)

(58) Field of Classification Search
None
See application file for complete search history.

(56) References Cited

U.S. PATENT DOCUMENTS

| | | | | |
|---|---|---|---|---|
| 2009/0327172 | A1* | 12/2009 | Liu | G06N 20/00 706/12 |
| 2014/0358509 | A1* | 12/2014 | Thakur | G05B 17/02 703/7 |
| 2017/0255452 | A1* | 9/2017 | Barnes | H04L 69/18 |
| 2019/0349263 | A1* | 11/2019 | Ghosh | H04L 41/16 |
| 2020/0193221 | A1* | 6/2020 | Aftab | G06K 9/00993 |
| 2020/0250585 | A1* | 8/2020 | Liu | G06N 20/10 |

OTHER PUBLICATIONS

Qianchuan Ye, "A verified Protocol Buffer Compiler", Jan. 2019, ACM (Year: 2019).*

* cited by examiner

*Primary Examiner* — Lewis A Bullock, Jr.
*Assistant Examiner* — Mark A Gooray
(74) *Attorney, Agent, or Firm* — Greenblum & Bernstein, P.L.C.

(57) ABSTRACT

Systems and methods for generating a data model from protocol buffer compiler generated Java classes are provided. The methods include obtaining a protocol buffers schema; using the obtained protocol buffers schema to generate a plurality of Java classes; determining, from the plurality of Java classes, a plurality of attributes; determining, for each respective attribute, a corresponding attribute type; and using each respective attribute and each corresponding attribute type to extract model information to be included in the data model. The extracted model information may be adjusted based on whether the information matches with an expectation regarding the model information.

18 Claims, 4 Drawing Sheets

GENERATION OF DATA MODEL FROM PROTOCOL BUFFER COMPILER GENERATED JAVA CLASSES

BACKGROUND

1. Field of the Disclosure

This technology generally relates to methods and systems for generating a data model, and more particularly to methods and systems for generating a data model from protocol buffer compiler generated Java classes.

2. Background Information

Protocol buffers (also referred to herein as "protobuf") are a language-neutral, platform-neutral mechanism for serializing structured data. In order to make effective use of protocol buffers, a data format of a source system must be mapped to protocol buffers. In order to facilitate such a mapping, a data model may be extracted manually from the specification of the source system.

Typically, a developer may be provided with protobuf schemas, which are a set of inter-referenced files. In this aspect, the developer is required to manually traverse through the protobuf schema tree in order to build the data model and enter the data model into a mapping spreadsheet. In many instances, the protobuf schemas are complicated, multi-hierarchy protocol buffer schemas. In addition, as a result of design choices made by Google as the developer of protobuf, the Java classes that are compiled from protobuf are of a non-standard and proprietary form, and therefore, conventional tools for extracting a data model from Java classes are unable to do so with respect to protobuf. For these reasons, the process of generating the data model may be extremely laborious and time-consuming.

Therefore, in view of the above, there is a need for a tool that has a capability of generating a data model from protobuf compiler generated Java classes in an efficient and uniform manner.

SUMMARY

The present disclosure, through one or more of its various aspects, embodiments, and/or specific features or sub-components, provides, inter alia, various systems, servers, devices, methods, media, programs, and platforms for generating a data model from protobuf compiler generated Java classes.

According to an aspect of the present disclosure, a method for generating a data model is provided. The method is implemented by a processor on a computing device. The method includes: obtaining a first protocol buffers schema; using the obtained first protocol buffers schema to generate a first plurality of Java classes; determining, from the first plurality of Java classes, a plurality of first attributes; determining, for each respective first attribute included in the plurality of first attributes, a corresponding first attribute type; and using each respective first attribute and each corresponding first attribute type to extract first model information to be included in the data model.

The first model information may include a first list of values.

The using each respective first attribute and each corresponding first attribute type to extract first model information may include extracting a first set of parameter values that corresponds to a predetermined first set of parameters.

The method may further include comparing the extracted first model information with an expected content of the first model information to determine whether a match exists, and when the extracted first model information is determined as not matching the expected content, adjusting the extracted first model information based on a result of the comparing.

The method may further include: obtaining a second protocol buffers schema; using the obtained second protocol buffers schema to generate a second plurality of Java classes; determining, from the second plurality of Java classes, a plurality of second attributes; determining, for each respective second attribute included in the plurality of second attributes, a corresponding second attribute type; and using each respective second attribute and the corresponding second attribute type to extract second model information to be included in the data model.

The method may further include comparing the extracted second model information with the extracted first model information in order to determine whether the data model is consistent with respect to the obtained first protocol buffers schema and the obtained second protocol buffers schema.

The determining the plurality of first attributes may include identifying a plurality of attributes that are included in the first plurality of Java classes and determining, for each identified attribute, whether to exclude the identified attribute based on a predetermined criterion.

The data model may have a protocol buffers format.

The data model may have an eXtensible Markup Language (XML) format.

The data model may have a Unified Modeling Language (UML) format.

According to another aspect of the present disclosure, a system for generating a data model is provided. The system includes a processor and a memory. The processor is configured to: obtain a first protocol buffers schema; use the obtained first protocol buffers schema to generate a first plurality of Java classes; determine, from the first plurality of Java classes, a plurality of first attributes; determine, for each respective first attribute included in the plurality of first attributes, a corresponding first attribute type; and use each respective first attribute and each corresponding first attribute type to extract first model information to be included in the data model.

The first model information may include a first list of values.

The processor may be further configured to extract the first model information by extracting a first set of parameter values that corresponds to a predetermined first set of parameters.

The processor may be further configured to compare the extracted first model information with an expected content of the first model information to determine whether a match exists, and when the extracted first model information is determined as not matching the expected content, the processor may be further configured to adjust the extracted first model information based on a result of the comparing.

The processor may be further configured to: obtain a second protocol buffers schema; use the obtained second protocol buffers schema to generate a second plurality of Java classes; determine, from the second plurality of Java classes, a plurality of second attributes; determine, for each respective second attribute included in the plurality of second attributes, a corresponding second attribute type; and use each respective second attribute and the corresponding second attribute type to extract second model information to be included in the data model.

The processor may be further configured to compare the extracted second model information with the extracted first model information in order to determine whether the data model is consistent with respect to the obtained first protocol buffers schema and the obtained second protocol buffers schema.

The processor may be further configured to determine the plurality of first attributes by identifying a plurality of attributes that are included in the first plurality of Java classes and determining, for each identified attribute, whether to exclude the identified attribute based on a predetermined criterion.

The data model may have a protocol buffers format.

The data model may have an eXtensible Markup Language (XML) format

The data model may have a Unified Modeling Language (UML) format.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
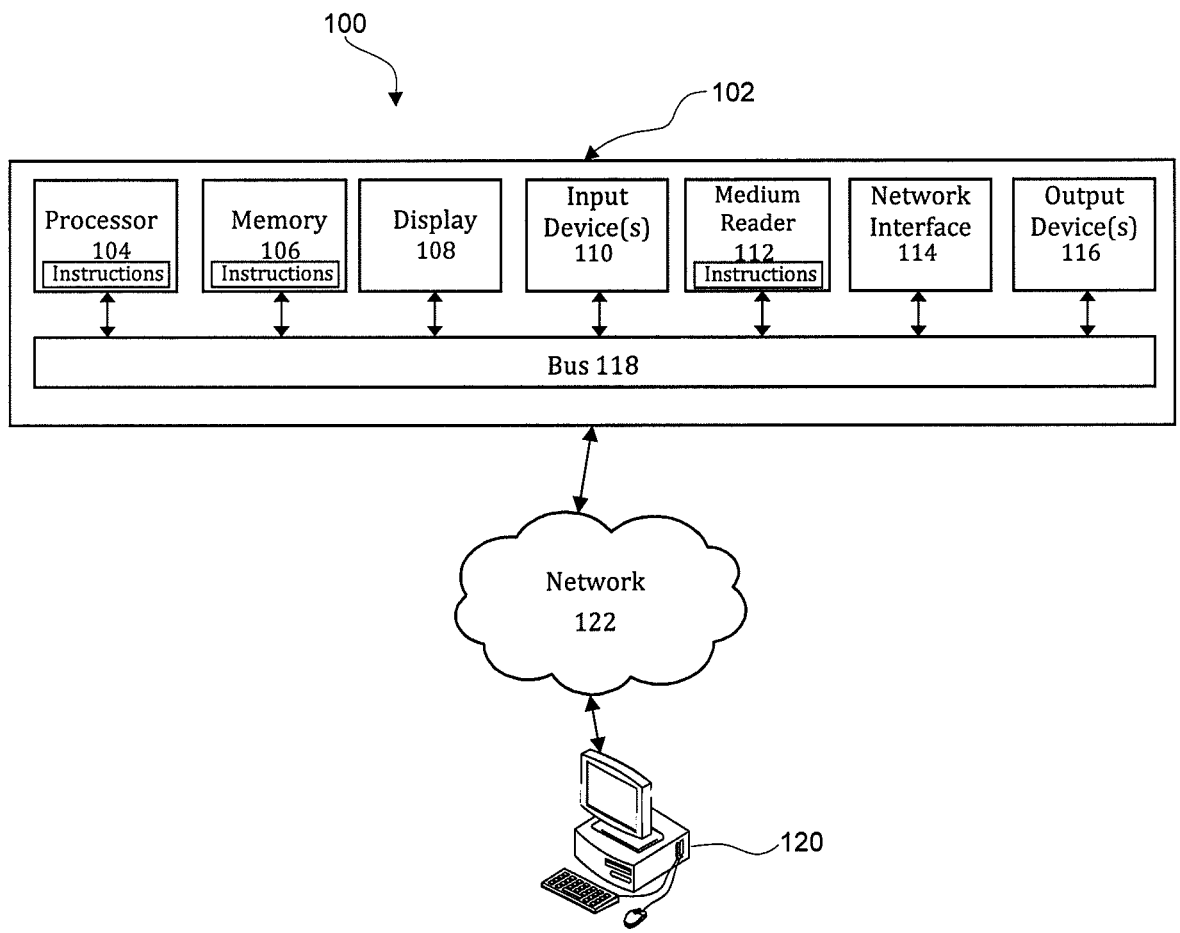
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a client-server user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of generating a data model from protobuf compiler generated Java classes.

Figure 2:
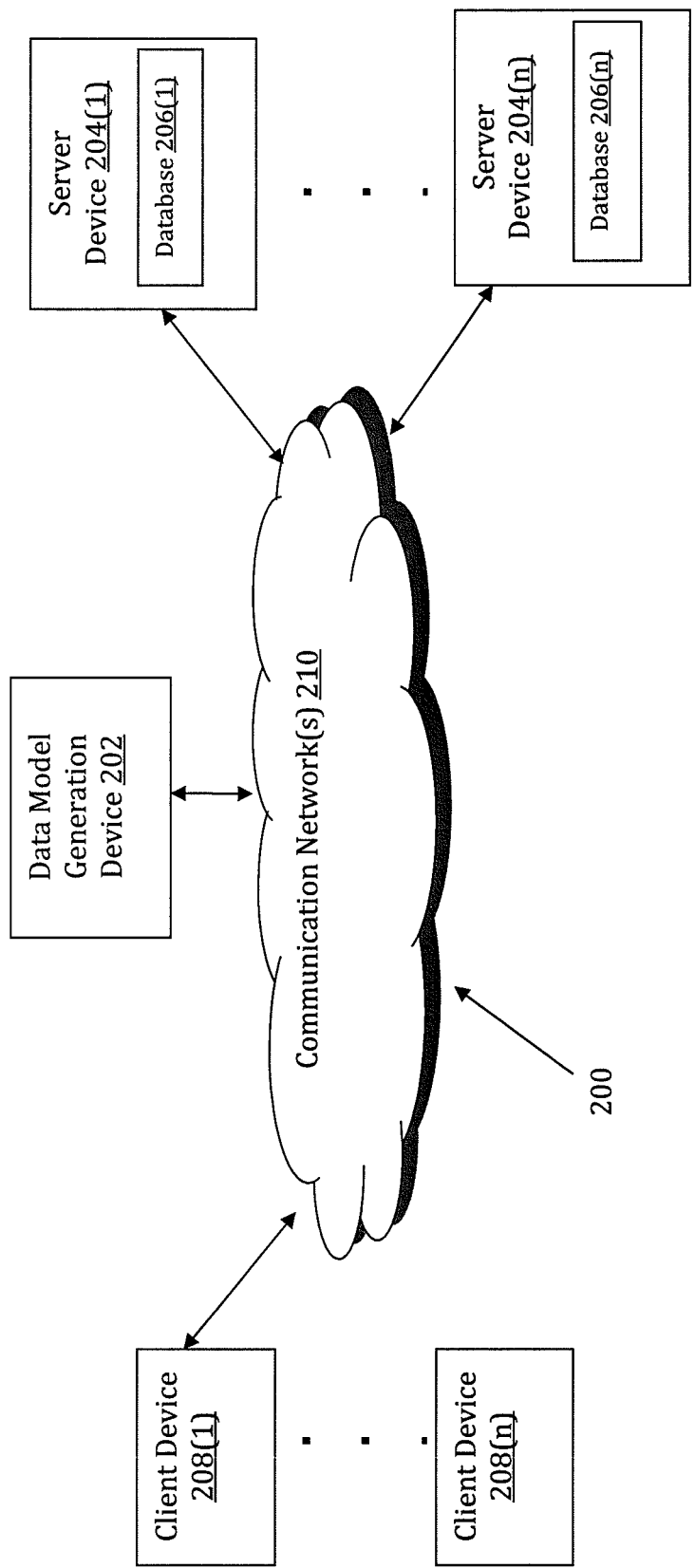
FIG. 2 illustrates an exemplary diagram of a network environment.

Referring to FIG. 2, a schematic of an exemplary network environment 200 for implementing a method for generating a data model from protobuf compiler generated Java classes is illustrated. In an exemplary embodiment, the method is executable on any networked computer platform, such as, for example, a wireless mobile communication device, i.e., a smart phone.

The method for generating a data model from protobuf compiler generated Java classes may be implemented by a Data Model Generation (DMG) device 202. The DMG device 202 may be the same or similar to the computer system 102 as described with respect to FIG. 1. The DMG device 202 may store one or more applications that can include executable instructions that, when executed by the DMG device 202, cause the DMG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DMG device 202 itself, may be located in virtual server(s) running in a cloud-based computing environment rather than being tied to one or more specific physical network computing devices. Also, the application(s) may be running in one or more virtual machines (VMs) executing on the DMG device 202. Additionally, in one or more embodiments of this technology, virtual machine(s) running on the DMG device 202 may be managed or supervised by a hypervisor.

In the network environment 200 of FIG. 2, the DMG device 202 is coupled to a plurality of server devices 204(1)-204(n) that hosts a plurality of databases 206(1)-206(n), and also to a plurality of client devices 208(1)-208(n) via communication network(s) 210. A communication interface of the DMG device 202, such as the network interface 114 of the computer system 102 of FIG. 1, operatively couples and communicates between the DMG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DMG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DMG devices that efficiently generate data models from protobuf compiler generated Java classes.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DMG device 202 may be a standalone device or integrated with one or more other devices or apparatuses, such as one or more of the server devices 204(1)-204(n), for example. In one particular example, the DMG device 202 may include or be hosted by one of the server devices 204(1)-204(n), and other arrangements are also possible. Moreover, one or more of the devices of the DMG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DMG device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store protobuf schemas, Java class data, attribute-related data, parameter data, and any other data that relates to generating a data model from protobuf compiler generated Java classes.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a primary/secondary approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a web application. Accordingly, the client devices 208(1)-208(n) may be mobile computing devices, desktop computing devices, laptop computing devices, tablet computing devices, virtual machines (including cloud-based computers), and/or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DMG device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DMG device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DMG device 202, the server devices 204(1)-204(n), or the client devices 208(1)-208(n), for example, may be configured to operate as virtual instances on the same physical machine. In other words, one or more of the DMG device 202, the server devices 204(1)-204(n), or the client devices 208(1)-208(n) may operate on the same physical device rather than as separate devices communicating through communication network(s) 210. Additionally, there may be more or fewer DMG devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
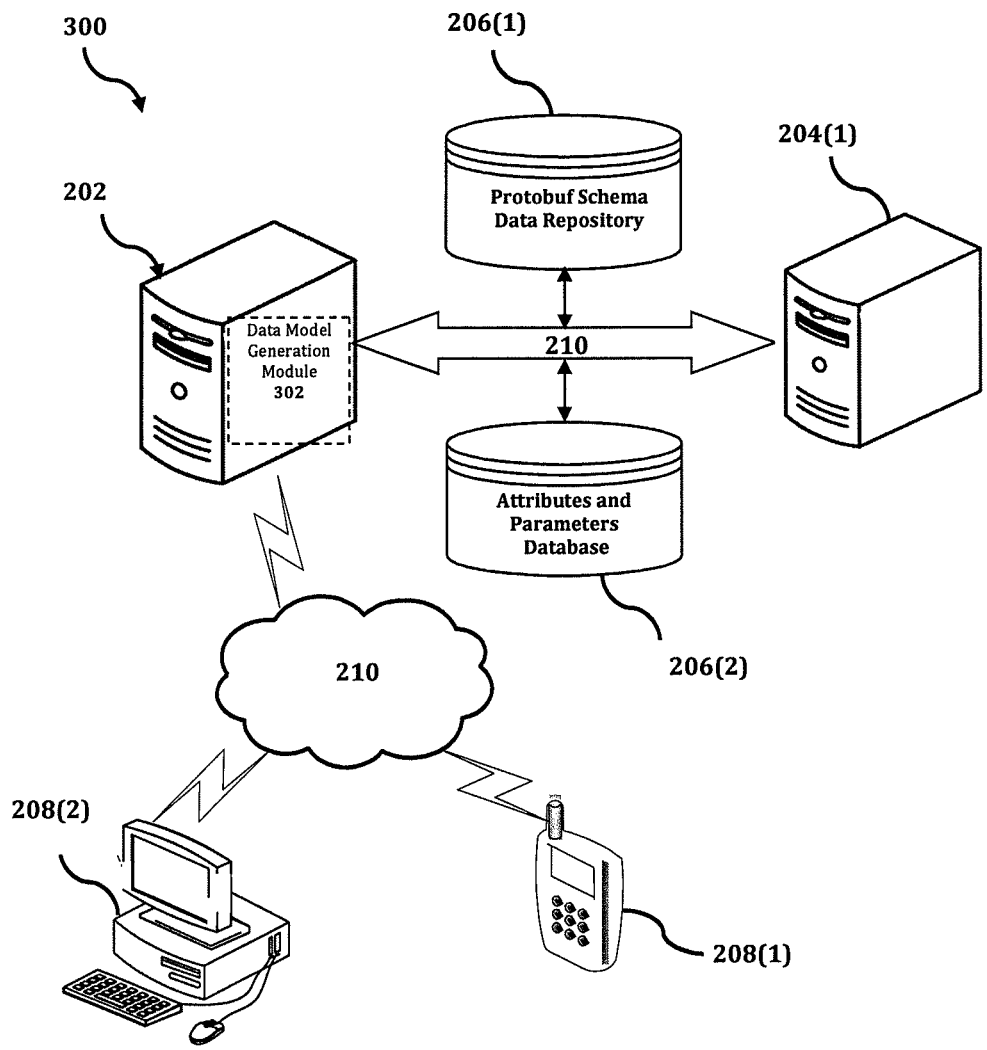
FIG. 3 shows an exemplary system for generating a data model from protocol buffer compiler generated Java classes.

The DMG device 202 is described and shown in FIG. 3 as including a data model generation module 302, although it may include other modules, databases, or applications, for example. As will be described below, the data model generation module 302 is configured to process large numbers of protobuf schemas and attributes of Java classes in order to generate a data model in an automated, efficient, scalable, and reliable manner.

An exemplary process 300 for generating a data model from protobuf compiler generated Java classes by utilizing the network environment of FIG. 2 is shown as being executed in FIG. 3. Specifically, a first client device 208(1) and a second client device 208(2) are illustrated as being in communication with DMG device 202. In this regard, the first client device 208(1) and the second client device 208(2) may be "clients" of the DMG device 202 and are described herein as such. Nevertheless, it is to be known and understood that the first client device 208(1) and/or the second client device 208(2) need not necessarily be "clients" of the DMG device 202, or any entity described in association therewith herein. Any additional or alternative relationship may exist between either or both of the first client device 208(1) and the second client device 208(2) and the DMG device 202, or no relationship may exist.

Further, DMG device 202 is illustrated as being able to access a protobuf schema data repository 206(1) and an attributes and parameters database 206(2). The data model generation module 302 may be configured to access these databases for implementing a process for generating a data model from protobuf compiler generated Java classes in a near-real-time mode.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DMG device 202 via broadband or cellular communication. Of course, these embodiments are merely exemplary and are not limiting or exhaustive.

Upon being started, the data model generation module 302 executes a process for generating a data model from protobuf compiler generated Java classes. An exemplary process for generating a data model from protobuf compiler generated Java classes is generally indicated at flowchart 400 in FIG. 4.

Figure 4:
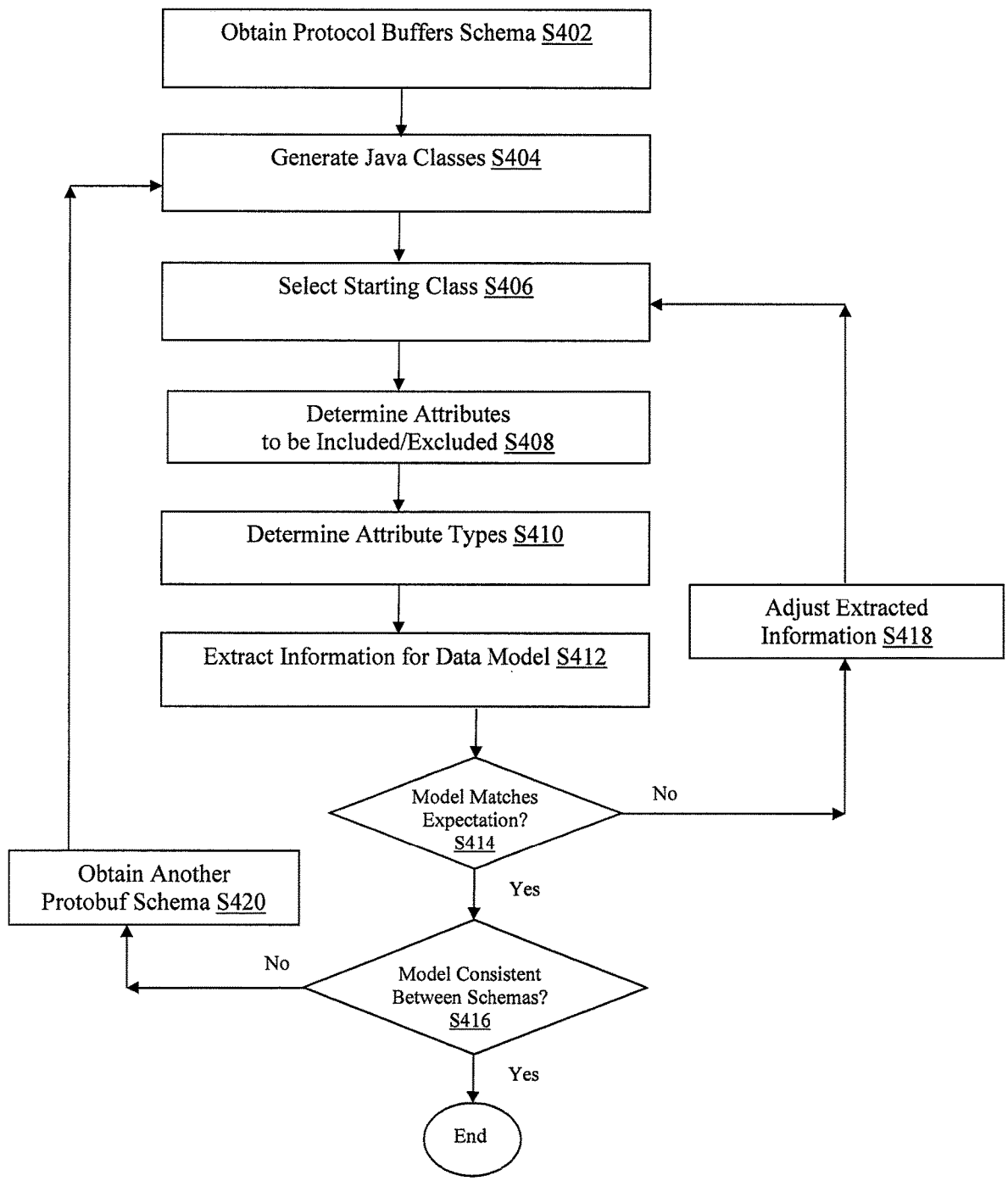
FIG. 4 is a flowchart of an exemplary method for generating a data model from protocol buffer compiler generated Java classes.

In the process 400 of FIG. 4, at step S402, the data model generation module 302 obtains a protobuf schema. In an exemplary embodiment, a plurality of predetermined protobuf schemas may relate to the data model to be generated, and a first schema may be selected from this set of schemas.

At step S404, the data model generation module 302 generates Java classes from the selected protobuf schema. In an exemplary embodiment, the Java classes are generated by a protobuf compiler that processes the protobuf schema.

At step S406, a starting class is selected from among the generated Java classes. In an exemplary embodiment, a predetermined criterion may be applied in order to determine which class is selected as the starting class. In an exemplary embodiment, the selection of the starting class may be tentative, and in this aspect, if it is later determined that a selection of a different starting class may lead to a more robust data model, then a different starting class may be selected.

At step S408, a set of attributes that relates to the generated Java classes is determined. In an exemplary embodiment, each generated Java class is associated with corresponding attributes, which are identified, and then a determination is made regarding which identified attributes are to be included and which are to be excluded for the purpose of generating the data model.

At step S410, the attribute types of each attribute are determined. Then, at step S412, the determined attributes and the corresponding attribute types are used to facilitate an extraction of information that is to be included in the data model. In an exemplary embodiment, an attribute may be associated with a list of values, and the list of values may be extracted as the relevant information for the data model. In an exemplary embodiment, the information to be included in the data model is arranged in a form of a spreadsheet that includes each respective attribute, its corresponding attribute type, and its corresponding list of values. In an exemplary embodiment, the data model may have a format, such as, for example, a protobuf format, an eXtensible Markup Language (XML) format, a Unified Modeling Language (UML) format, and/or any other suitable type of format.

At step S414, a determination is made as to whether the data model being generated based on the extracted information matches with an expected version of the data model. If the extracted data model does not sufficiently match with the expected version of the data model, then at step S418, the extracted information may be adjusted, and the process may then return to step S406 in order to regenerate the data model based on the adjustments.

If the extracted data model is determined as being a match with respect to the expected version of the data model, then at step S416, a determination is made as to whether the data model is consistent between at least two protobuf schemas. Thus, if only one protobuf schema has been processed thus far, or if a determination is made that there is a lack of consistency, then at step S420, another protobuf schema is obtained, and the process returns to step S404 in order to augment the generation of the data model. Conversely, if a determination is made that the data model is consistent between multiple protobuf schemas, then the process 400 ends.

In an exemplary embodiment, the extraction of information to be included in the data model may be performed by a processor that functions as a model extractor. The model extractor may include a list of parameters for which corresponding descriptions and values are provided. In one exemplary embodiment, the model extractor may include the list of parameters shown below in Table 1.

TABLE 1

Model Extractor Parameter List Example

| Parameter name | Input/Output or both | Description | Values |
|---|---|---|---|
| inClass | input | The fully qualified root class. This is the starting class [sc]. As the ode recursively goes down the tree the sm changes. | |
| result | both | This is mutable stringbuffer which gets passed and modified at every recursive navigation down the tree | Initally set to "" |
| treePath | input | the location in the tree being traversed. This is passed on recursively | |
| stopRecursionOn | input | Contains the list of fully qualified classes where the recursion should stop, apart from the classes which match java.*, javax.* and com.google.protobuf.* | |
| eol | input | End of line character(s) | "\r\n" |
| mapTypes | input | List of map types | "java.util.Map<K, V>, java.util.HashMap" |
| collectionTypes | input | the types for collection. The code also goes a level higher and looks at the interface the type implemented to find out if it is a collection. | java.util.List, java.util.ArrayList, java.util.Set, java.util.SortedSet, java.util.NavigableSet, java.util.Queue, java.util.Deque, java.util.Collection<E> |
| displayOption | input | If SHORT the class name of the attribute will not be prepended, If LONG the classname will be prepended to the attribute. | ["SHORT", "LONG"] |
| attributeExclusionPatterns | input | Contains list of regular expressions. If the attribute name matches any of those, it will be excluded | bitField0__, bitField1__, memoizedisinitialized, (\\S+Builder__)$ |
| innerClassPointerAppend | input | The inner class which contains the model information | "$Builder" |
| option | input | If "PROTO" it will do the special processing for protobuf compiler generated classes, If not "PROTO" then it will do the regular processing to generate java classes not generated via protobuf compiler ( say coming out of a UML tool like Magic Draw). | |

In the example of Table 1, the model extractor may operate as follows: 1) Select a starting class for which a name matches $Builder. 2) Consider all private attributes except those for which the name matches one of (bitField0_ or *Builder_ or memoizedisinitialized) (noting that the name matching list corresponds to the Table 1 entry for the parameter attributeExclusionPatterns). Remove the "_" at the end from the attribute name. 3) If an attribute type is java.lang.object, look for a method for which the name matches "set"+[name of the attribute with first letter being uppercased]. The return value of the function will be the type of the attribute.

The result of these steps is that a complete set of attributes and corresponding types has been determined.

For each attribute, the following functions are then performed recursively: 1) If java list, consider the type of the list member and add the [ ] to notation. 2) If java map, do the same as for java list, except also provide an additional entry for the key. The type of the key is never expanded. 3) If the class is java.* or javax.* or com.google.protobuf.*, then the recursion stops at that level. 4) Check whether the attribute corresponds to an enumeration (list of values). If an enumeration ("enum") is indicated, include the enum list and stop the recursion. 5) Select a new class to replace the starting class and repeat the preceding steps.

Accordingly, with this technology, an optimized process for generating a data model is provided. The optimized process facilitates an automation of a generation of a data model from protocol buffer compiler generated Java classes, thereby mitigating the need to manually generate such a data model.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for using a data model generation device for generating a data model, the method being implemented by a processor on the data model generation device, the method comprising:
   obtaining a first protocol buffers schema;
   compiling the obtained first protocol buffers schema to generate a first plurality of Java classes;
   executing a model extractor to automatically perform the steps of:
      selecting, from the generated first plurality of Java classes, a starting class:
      A) determining, from the starting class, a plurality of first attributes;
      B) determining, for each respective first attribute included in the plurality of first attributes, a corresponding first attribute type;
      C) using each respective first attribute and each corresponding first attribute type to extract first model information to be included in the data model;

D) comparing the extracted first model information with a list of expected content of the model information to determine whether a match exists;

when the extracted first model information is determined as not matching the expected content, selecting from the generated first plurality of Java classes, a different Java class that is different from the starting class, and extracting and comparing different model information from the different Java class by repeating steps A), B), C) and D) using the different Java class; and when the extracted different model information matches the list of expected content, generating the data model based on the extracted different model information.

2. The method of claim 1, wherein the first model information includes a first list of values.

3. The method of claim 1, wherein the using each respective first attribute and each corresponding first attribute type to extract first model information comprises extracting a first set of parameter values that corresponds to a predetermined first set of parameters.

4. The method of claim 1, further comprising:
obtaining a second protocol buffers schema;
using the obtained second protocol buffers schema to generate a second plurality of Java classes;
determining, from the second plurality of Java classes, a plurality of second attributes;
determining, for each respective second attribute included in the plurality of second attributes, a corresponding second attribute type; and
using each respective second attribute and the corresponding second attribute type to extract second model information to be included in the data model.

5. The method of claim 4, further comprising comparing the extracted second model information with the extracted first model information in order to determine whether the data model is consistent with respect to the obtained first protocol buffers schema and the obtained second protocol buffers schema.

6. The method of claim 1, wherein the determining the plurality of first attributes comprises identifying a plurality of attributes that are included in the first plurality of Java classes and determining, for each identified attribute, whether to exclude the identified attribute based on a predetermined criterion.

7. The method of claim 1, wherein the data model has a protocol buffers format.

8. The method of claim 1, wherein the data model has an eXtensible Markup Language (XML) format.

9. The method of claim 1, wherein the data model has a Unified Modeling Language (UML) format.

10. A system for generating a data model, the system comprising:
a processor; and
a memory,
wherein the processor is configured to:
obtain a first protocol buffers schema;
compile the obtained first protocol buffers schema to generate a first plurality of Java classes;
execute a model extractor to automatically:
select, from the generated first plurality of Java classes, a starting class;
A) determine, from the starting class, a plurality of first attributes;
B) determine, for each respective first attribute included in the plurality of first attributes, a corresponding first attribute type;
C) use each respective first attribute and each corresponding first attribute type to extract first model information to be included in the data model;
D) compare the extracted first model information with a list of expected content of the first model information to determine whether a match exists;

when the extracted first model information is determined as not matching the expected content, select, from the generated first plurality of Java classes, a different Java class that is different from the starting class, and extract and compare different model information from the different Java class by repeating steps A), B), C), and D) using the different Java class; and when the extracted different model information matches the list of expected content, generate the data model based on the extracted different model information.

11. The system of claim 10, wherein the first model information includes a first list of values.

12. The system of claim 10, wherein the processor is further configured to extract the first model information by extracting a first set of parameter values that corresponds to a predetermined first set of parameters.

13. The system of claim 10, wherein the processor is further configured to:
obtain a second protocol buffers schema;
use the obtained second protocol buffers schema to generate a second plurality of Java classes;
determine, from the second plurality of Java classes, a plurality of second attributes;
determine, for each respective second attribute included in the plurality of second attributes, a corresponding second attribute type; and
use each respective second attribute and the corresponding second attribute type to extract second model information to be included in the data model.

14. The system of claim 13, wherein the processor is further configured to compare the extracted second model information with the extracted first model information in order to determine whether the data model is consistent with respect to the obtained first protocol buffers schema and the obtained second protocol buffers schema.

15. The system of claim 10, wherein the processor is further configured to determine the plurality of first attributes by identifying a plurality of attributes that are included in the first plurality of Java classes and determining, for each identified attribute, whether to exclude the identified attribute based on a predetermined criterion.

16. The system of claim 10, wherein the data model has a protocol buffers format.

17. The system of claim 10, wherein the data model has an eXtensible Markup Language (XML) format.

18. The system of claim 10, wherein the data model has a Unified Modeling Language (UML) format.

* * * * *